United States Patent [19]

Salvadori

[11] Patent Number: 4,515,541
[45] Date of Patent: May 7, 1985

[54] DEVICES FOR VULCANIZING TIRES

[75] Inventor: Bruno Salvadori, Milan, Italy

[73] Assignee: Societa Pneumatici Pirelli, Milan, Italy

[21] Appl. No.: 569,916

[22] Filed: Jan. 11, 1984

[30] Foreign Application Priority Data

Jan. 12, 1983 [IT] Italy ............................... 19067 A/83

[51] Int. Cl.³ ............................................. B29H 5/02
[52] U.S. Cl. ...................................... 425/47; 425/40; 425/46
[58] Field of Search ......................... 425/40, 46, 47, 45

[56] References Cited

U.S. PATENT DOCUMENTS

| 2,147,081 | 2/1939 | Beckman | 425/40 X |
| 3,713,929 | 1/1973 | Bottasso et al. | 425/45 X |
| 3,868,203 | 2/1975 | Turk | 425/40 X |
| 3,910,735 | 10/1975 | Caretta | 425/46 |
| 4,116,595 | 9/1978 | Fike et al. | 425/40 X |

Primary Examiner—J. Howard Flint, Jr.
Attorney, Agent, or Firm—Birch, Stewart, Kolasch and Birch

[57] ABSTRACT

The subject matter of the present invention concerns presses for vulcanizing vehicle-wheel tires and in particular, those presses provided with a centripetal-type mold. For the purpose of optional heating of the sectors of the mold while avoiding heat-dispersion, heating-fluid losses, or any lowering of the temperature during the moving periods of the mold, there is provided, in the body of each sector, a network of channels that are connected, for example, through flexible tubing, to networks of the other adjacent sectors, in such a way as to realize a closed circuit with regard to the outside ambient, within which circuit the heating-fluid is permanently caused to circulate.

6 Claims, 6 Drawing Figures

DEVICES FOR VULCANIZING TIRES

BACKGROUND OF THE INVENTION

The present invention concerns devices used for molding and for vulcanizing elastomeric material articles and especially, the presses used for vulcanizing vehicle-wheel tires.

Once any elastomeric material article is formed into a definite structure, it has to undergo a vulcanizing process —i.e. a thermal treatment, at a high temperature for a set duration, whereby the elastomeric material loses its characteristics of plasticity, and becomes transformed into an elastic material, provided with specific characteristics of mechanical resistance. In the particular instance of vehicle-wheel tires, the latter are enclosed inside a mold, then heated through conventional means known to technicians skilled in the art which thereupon, provides for the vulcanizing and the molding of the outer and inner surfaces of the tire. One problem of the heretofore used vulcanization processes is that of bringing the surfaces of the mold, which necessarily come into contact with the outer surface of the tire, to an adequate temperature and maintaining these surfaces at the specific temperature during the various working phases of the device including even during the opening cycles that are necessary for removing the vulcanized tire from the mold, and for re-loading a new, raw carcass into the mold for being vulcanized.

Included among the already known vulcanizing molds, there are the so-called centripetal-type molds that are necessary for vulcanizing radial tires. It is known that, in the crown zone, these tires are provided with an annular, reinforcing-structure that is circumferentially in-extensible, and which hence, does not allow for any expansion of the carcass when it is inside the vulcanizing mold. Therefore, for molding a tire and in particular, the tread pattern of the crown tread portion, it is necessary for the corresponding surface of the mold itself, to penetrate into the thickness of the tread-band. This is realized by working the mold surface, which corresponds to the outer perimeter surface of the tire, through a plurality of sectors that shift radially, in both directions, inwardly and outwardly. In such a manner the mold allows for the tire to be inserted therein, while the secotrs are in a radially expanded state. Next, the tread-band is molded through the radial, centripetal shifting of the sectors, and finally, the removal of the tire from the mold, through the further radial enlargement of the sectors.

It is clear that the problem of heating the surfaces in contact with the tire to be vulcanized, are not easily solved as far as the above-mentioned configurations are concerned, owing to the fact that the sectors thereof have to be shiftable (movable) with respect to the mold axis and reciprocally to each other. Various attempts have been made for solving this problem. One of the first methods used consists of enclosing the mold inside a further container, into which a high temperature vapor is introduced. The vapor evidently yields up its heat to the diverse parts of the mold which hence, reach the necessary temperature for the vulcanizing process. Among other considerations this system presents a serious disadvantage due to the fact that every time this container is opened for allowing the mold to be opened and the vulcanized tire to be removed, all of the vapor introduced will necessarily be discharged from the container and any residual part of the vapor, i.e. that which might still remain in the container, in fact will also disperse into the surrounding ambient, such that the parts which constitute the mold will undergo cooling. Therefore, when the container is once again closed, and another raw tire is introduced into the mold, a new quantity of vapor will have to be provided, and the parts of the mold, which in the meantime have cooled, will have to be once again brought back to the vulcanizing temperature required. This causes a noticeable lengthening of the vulcanizing cycle time, and a considerable dispersion or loss of heat.

For preventing this loss of precious energy, it is desirable to circulate the vapor inside the respective cavity provided in the supporting structure of the diverse mold parts and, in particular, in the containing-ring that guides the movement of the sectors. The disadvantage to be found in such a system is manifested by a reduction of the temperature between the containing-ring and the surface of the sector in contact with the tire which requires the ring to be raised to a decidedly higher temperature than what is generally specified for the vulcanizing process. In an effort to improve this procedure, attempts have been made to circulate the heating vapor inside a respective cavity circumscribed directly by the sectors. However, with this system there results a loss of vapor to the outside ambient each time that the mold is opened and sectors shift circumferentially and reciprocally one to the other. Hence, the very same drawbacks that are found in the device with the container previously described, are also experienced.

SUMMARY OF THE INVENTION

Therefore, it is an object of the present invention to obtain direct heating of the sectors of a mold by means of circulating vapor inside the sectors without leading to vapor loss to the outside ambient during the moving phases of the mold.

In accordance with the present invention, a device is provided for molding and vulcanizing elastomeric-material articles, specifically vehicle-tires, comprising two continuous, coaxial annular sections, axially and reciprocally shiftable (movable), corresponding to the tire sidewalls, and a plurality of sectors, corresponding to the outer perimeter zone of the tire, interposed between the annular sections, and concentrically disposed with respect to the latter. The sectors are connected to the radially innermost surface of a containing-ring, coaxial with the annular sections and axially shiftable with respect to the same. The sectors are radially movable in both directions with respect to the common axis of both of the sections, and axially movable with respect to at least one of the sections. Each sector is provided with a matrix on its radial innermost surface, that is appropriate for molding on the perimeter of the tire a corresponding portion of the tread pattern, and further, on its radial external surface, with surfaces that are inclined with respect to the axis of the ring and coupled with corresponding portions of the radial inner surface of the ring, having a reciprocal sliding capability for realizing the radial shifting of the sectors. The device of the present invention is characterized by the fact that the sectors are provided with cavities, which constitute a part of a circuit that is closed to the outside environment or ambient, which allows for the circulation of a fluid for directly heating the sectors.

According to the present invention, the above cavities of the device comprise a network of channels providing points of entry from outside the sector, for the inlet (introduction) and outlet (removal) of the fluid. Moreover, the network of channels is provided with a plurality of axial blind-channels, each having its axis parallel to the axis of the device, and all being connected to one another through a plurality of transversal blind-channels, with each transversal channel connecting at least two axial channels. The network of channels are connected with the radial outer surface of the sector through two substantially radial channels, respectively below and above, connected to at least one of the axial channels. The radial lower channel is disposed in correspondence to the axially lower extremity of the axial channel, the transversal and radial channels having their own axes inclined, with respect to the axes of the axial channels, at an angle that is diverse to about 90°.

Preferably, the angle-of-inclination of the transversal and radial channels, is from between 85° and 89°. All of the sectors are connected preferably in series, one to the other, through a ring-shaped circuit; each upper radial channel being connected with the radial lower channel of the adjacent sector, with the exception of one radial upper channel being connected with a means for introducing the fluid, and its corresponding radial lower channel being connected with a means for drawing and/or discharging the fluid.

According to a further embodiment of the present invention, the above network of channels is connected, in a fluid-tight manner, with a further similar system of channels provided in the matrix. Preferably, the sectors are separated from the adjacent parts of the mold, through surfaces of a thermally insulating material. Should the thermally insulating material possess anti-frictional characteristics as well, it could conveniently constitute at least the covering of the inclined surfaces and hence, also of the axially upper and lower surfaces of the sectors, slidable against the corresponding surfaces of the adjacent parts of the device. It is preferred that the heating fluid of the above-said device be a vapor.

The present invention will be further explained with the aid of the following description and the attached FIGURES, that are given by way of illustration only, are not intended to limit the scope of the invention, and whereby:

DETAILED DESCRIPTION

Figure 1:
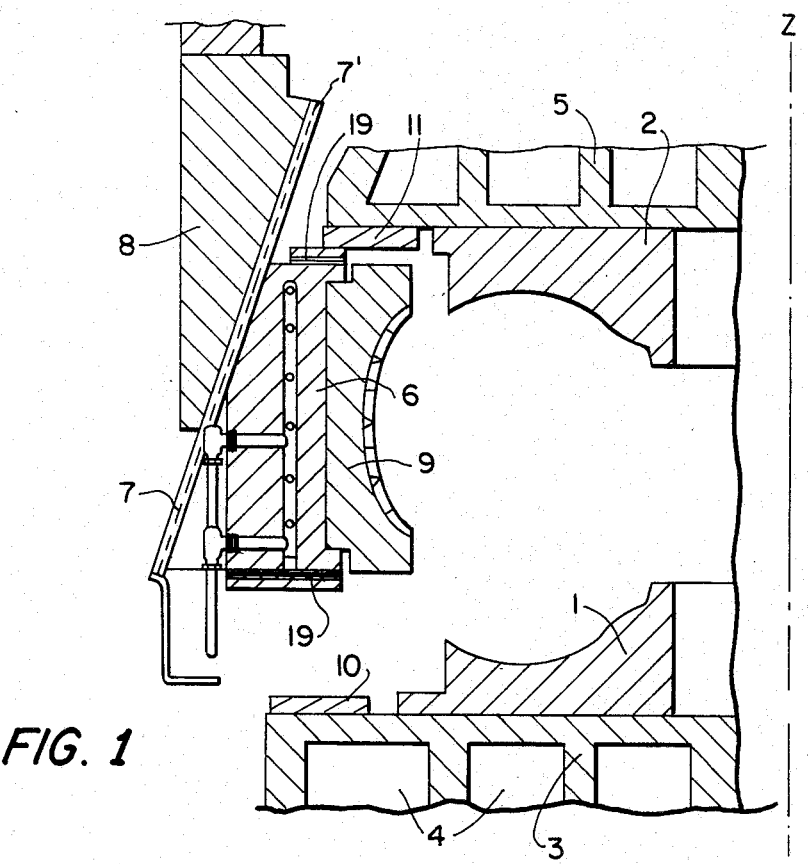
FIG. 1 illustrates a device according to the invention, in its open position.

With reference to FIG. 1, there is illustrated a device for molding and vulcanizing tires, represented as a centripetal-type mold in its open position. The specific mold consists of two, continuous annular-sections, 1 and 2, coaxial with each other according to the axis z—z, hereinafter referred to as the 'flanks', and which correspond to the tire sidewalls. The lower flank 1, is fixed to a plate 3 which, in turn, is fixed to the base of the device.

The plate is provided with cavities 4, inside which a heating fluid circulates, such as a vapor, which maintains the flank 1 at the temperature desired, both, during the tire-vulcanizing phase, as well as during the phase of opening the mold. The upper flank 2, is fixed to a plate 5 which, in turn, is fixed to a part of the device which is not shown (since it is not relevant to the present invention), which allows for the axial shifting of the flank 2 along the axis z—z and in respect of the lower flank 1. Even the plate 5 is provided with appropriate cavities for the circulation of the heating-fluid, in a way similar to that of plate 3. Interposed between flanks 1 and 2, is a plurality of sectors 6, disposed concentrically in a ring and co-axial to the axis z—z, that are radially shiftable, in both directions, with respect to the axis.

The above sectors are fixed, by means of appropriate guides 7, disposed on their radially outer surfaces, to a containing-ring 8, also co-axial with the axis z—z, provided on its radially inner surface, with corresponding guides 7'. The containing ring, with its axial movement, controls the radial and axial movement of the sectors, in both directions. The axial movement of the ring takes place either simultaneously with the axial movement of the plate 5, or independent of the axial movement, as will be more completely defined below. Each sector is provided on its radially inner surface, with a matrix 9 that, in turn, is provided on its radially inner surface, with a series of reliefs and blades for penetrating the thickness of the tire tread-band, and for molding the tread-band with the tread pattern. In the body of each sector 6, there is provided a plurality of channels which shall be further described below.

Figure 2:
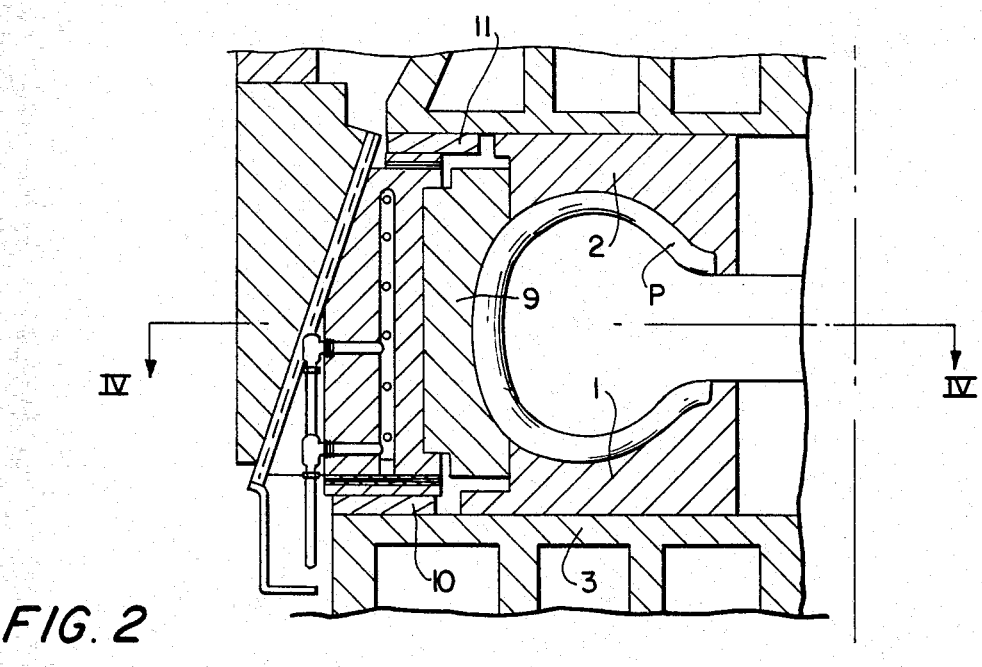
FIG. 2 illustrates the device of FIG. 1, in its closed position, with an unvulcanized raw-tire inserted into the mold.

By comparing FIGS. 1 and 2, it can easily be understood how the device of the present invention functions. Upon the introduction of a raw-tire carcass "P" into the mold so as to rest upon the lower flank 1, the ring 8 and the plate 5 will simultaneously be shifted towards the plate 3. When the axially lower surface of the sector 6 comes into contact with a corresponding sliding-surface 10, fixed to the plate 3, the axial movement of the sector stops as does the axial movement of the upper flank 2 and of the supporting plate 5, which establishes a permanent contact with the axial outer surface of the sectors 6 by means of the interpositioning of appropriate sliding surfaces 11. In this position moreover, the two flanks come into contact with the tire sidewalls, and they circumscribe exactly the cavity inside which the tire will be molded and vulcanized, defining specifically what the molding profile of the tire sidewalls will be.

Simultaneously therewith, the ring 8 follows the axial movement towards the base of the device. As a result of this movement and of the reciprocal coupling between ring 8 and sectors 6, according to the inclined planes defined by the pairs of sliding-guides, the sectors are forced to shift radially, in a centripetal manner, towards the axis z—z, carrying the matrix 9 into contact with corresponding surfaces of the flanks 1 and 2. During this movement, the relief areas disposed on the radially inner surface of the matrix, penetrate the thickness of the tire tread-band, which is maintained fixed with respect to its equatorial-plane, due both to the presence of the flanks 1 and 2, as well as to the pressure exercised by a suitable vulcanizing fluid that has, in the meantime, been introduced into the tire through one of the many ways that are well-known in the art.

Figure 4:
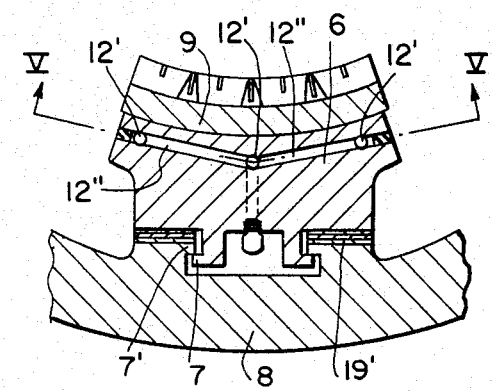
FIG. 4 illustrates an axial straight section of one of the sectors of the device according to the invention.
Figure 5:
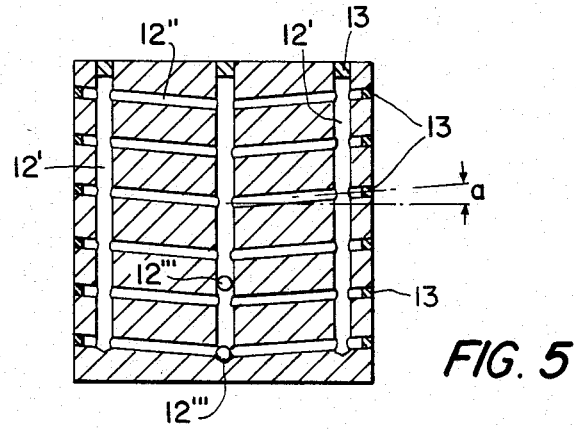
FIG. 5 illustrates a lateral section of a device according to FIG. 4.

FIG. 4 illustrates the axial section of a sector and of a part of the containing-ring, according to the plane IV—IV of FIG. 2. In FIG. 4 there can be observed the matrix 9, the body of the sector 6, provided with the above-mentioned channels, and the sliding-guides 7 and 7' for the coupling between the corresponding radially inner surface of the containing-ring 8 and the radially outer surface of the sector 6. The network of channels is illustrated in detail within the entire assembly of FIGS. 1, 4 and 5. According to a preferred form of the invention, the network consists of a plurality of axial channels 12 directed according to the axis of the vulcanizing device, connected one to the other by a network of transverse channels 12'', each one of which connects at least two axial channels. The channels 12'' are not directed perpendicular with respect to the axis of the channels 12'—i.e. according to an angle of 90°, but they present a certain inclination, defined by the angle "a" (FIG. 5). The inclination is preferably between 1° and 5° with respect to the equatorial plane of the mold or between 85° and 89° with respect to the axis of the axial channels 12'.

The inclination is provided for collecting the condensate in the lower portion of the axial channels for the discharge from the sector of the condensate. All of the channels described herein, are blind channels—i.e. closed to the outside ambient. In other words, they were made, axially for convenience sake, by piercing the sector from the outside and up to a certain depth. The entry-hole was closed, for example through suitable stoppers 13, in such a way as to completely insulate the network of channels from the outside ambient. Next, the network is connected to the radially outer surface of the sector by means of two radial channels 12''', disposed respectively above and below, that serve for introducing and/or discharging the fluid utilized for heating the sector itself.

Even the channels 12''', although illustrated as directed radially according to an angle of 90° with respect to the axial channel 12', can, in reality, be inclined with respect to the axis of the channel, according to an angle that is preferably equal, but which can also vary, with respect to the angle of inclination of the transverse channels 12''.

In a preferred form of the invention illustrated in FIG. 5, these two channels are connected with the central axis channel. The radial lower channel is connected with the axially lower extremity of the axial channel, and the upper radial channel flows into the axial channel at the highest altitude allowed by the requirements for preventing any mechanical interference between ring 8 and sector 6, that reciprocally slide along the pairs of inclined guides.

Figure 3:
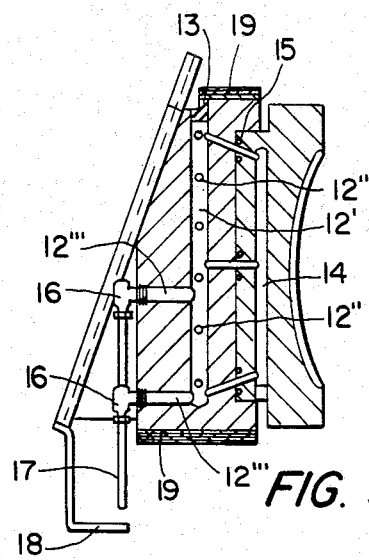
FIG. 3 illustrates a alternate form of an embodiment for the sectors of the device according to the invention.

FIG. 3 illustrates a further preferred form of the invention, according to which a channel system 14, quite similar to the network of channels 12, is provided inside the matrix 9, fixed to the sector 6. Naturally, in such an instance, the connection, between the two networks of channels, must be fluid-tight so as to prevent any blow-by of the heating-fluid through the coupling surfaces between the sector and the matrix. This requirement is satisfied through the use of suitable packings 15 disposed in the substantially radial joining zones of the channels where the two network are connected together.

All of the sectors are connected to each other and/or with a system for the feeding and discharging of a suitable heating-fluid, in a fluid-tight manner, in such a way as to realize a closed circuit for the circulation of the fluid. The circuit does not permit any loss to the external ambient, not even during the functioning of the device—i.e. during the phases of opening and closing the mold, with the resulting reciprocal shifting of the sectors.

Figure 6:
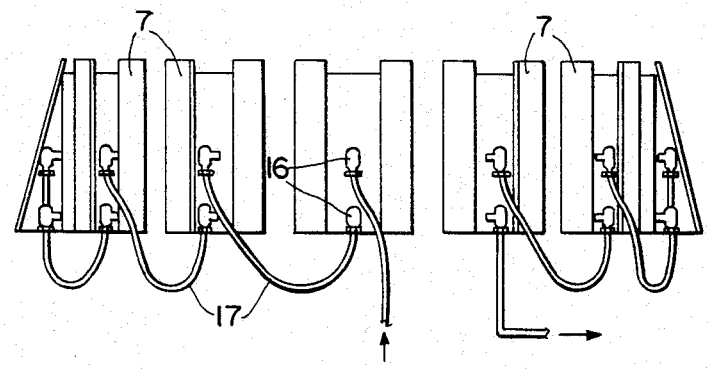
FIG. 6 illustrates a side view of the sectors of the device according to the invention.

The modes of connecting the sectors to each other can vary. In particular, there is described and illustrated in FIG. 6, the advantageous way of connecting the sectors in series, according to which each radial upper channel is connected with a radial lower channel of the adjacent sector. Naturally, a radial upper channel will be reserved for the connection with the system for introducing the fluid, while the corresponding radial lower channel, of the adjacent sector, will be connected with the system for extracting and/or discharging the fluid. In other words, the circulation of the fluid, through the plurality of sectors, can be conveniently realized by means of feeding with pressurized fluid, and extracting the same fluid with appropriate suction systems. All of the connections existing between the sectors and with the fluid feeding system that produce the closed circuit, are realized with intake-bushes 16, that engage with the radial channels 12''' and with flexible connecting-hoses 17, having appropriate characteristics of resistance to pressure and to heat and of fluid-tightness, which are protected from the outside ambient by a protective-shield 18, fixed to the lower surface of the sectors.

Another type of connection could, on the other hand, be the so-called "parallel" one, according to which all of the radial inlet-channels are connected to a single fluid-feeding ring, and all of the radial outlet-channels are connected to a single fluid-suction ring.

Moreover, each sector is thermally insulated from the circumscribing parts of the device, by means of sheets 19 of a suitable insulating material disposed in correspondence with the axial upper and lower surface and by sliding-guides which delimit the sector from the containing-ring. Quite possibly, these sheets of insulating material could constitute the sliding-surface itself of the sector, as noted in the example illustrated in FIG. 3. In this instance, the material should preferably also have anti-frictional characteristics for facilitating the sliding of the sector against the corresponding surfaces. For this purpose, the usage of a paste comprising fibre-glass and a silicone material, has proved to be quite convenient. When the insulating material constitutes the sliding-surface, it can be disposed both on the sector, as well as on the device part in contact with this sector. For example, the insulating material that separates the sector from the ring, can be disposed not on the sector, but upon the containing-ring, as can be seen illustrated in FIG. 4, where the plates 19' of the insulating material, which constitute the sliding surface, are fixed upon the ring, between the ring and sector, and the sector is maintained in contact with the plates, by means of the L-shaped guides 7 fixed to the body of the sector.

As already stated, for all of the operation, for heating the device in its entirety and for vulcanizing the tires, a vapor is preferred and utilized, although other suitable fluids can also find convenient application such as, for example, water, oil, or other types of fluid that are well known in the art. It stands to reason that the geometry of the network of channels 12 will be expressly chosen in relation to the particular type of fluid used.

There are multiple advantages to be realized from the device of the present invention. First, the fact of introducing the heating-fluid directly inside the sector, allows for a precise controlling of the temperature in the sector and, above all, of the matrix, which guarantees a uniform temperature on the entire surface in contact with the tire. In order to appreciate this advantage and its importance, it has to be remembered that the tread zone is the tire portion which presents the maximum thickness and the maximum structural complexity. From this it becomes essential to control the temperature in order to provide a uniform and measured distribution of heat. Obtaining uniformity of the heat in all of the portions of the mold is readily obtainable with the configuration of the present invention, a condition which was impossible to obtain when the matrix, relative to the tread, diverse from the annular sections relative to the sidewalls, had to be heated through conduction, while deriving its heat from the containing-ring, which was the element that was directly re-heatable by means of the fluid. The further advantage of also having the matrix provided with channels for the circulation of the heating fluid is readily appreciated.

A further advantage consists in better utilizing the heating-fluid and the heat transmitted by this fluid to the mold parts. In the first instance, it is clear that the closed circuit within which the fluid circulates, does not permit the loss of fluid to the outside ambient, which fact results in a considerable saving of energy. Moreover, the closed circuit allows for feeding the heated fluid to the sectors, even during the action phase, and in particular, during the opening of the mold, so that there is obviated any lowering of the temperature, to which the sectors of the known vulcanizing devices in the state of the art are subjected.

Still another advantage resulting from the fact of having to carry the heating-fluid directly into the sector, consists in the possibility of thermally insulating the sector towards the circumscribing parts of the device, in particular towards the lower and upper plates and towards the containing-ring. This was not evidently possible when the sector had to be heated by drawing its heat from these circumscribing parts and specifically from the ring that contained the sectors, the ring moreover, owing to its very structure, was clearly a notable source of heat dispersion.

It can be easily appreciated that the thermal insulation of the sector, with respect to the adjacent parts, allows for considerable reduction in the dispersion of heat towards the outside ambient resulting in a further saving of energy and in also improving the controlling of the temperature of the sector and of the matrix with quite an advantageous effect upon the quality of the finished tire.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A device for molding and vulcanizing a vehicle tire made of elastomeric material comprising:
   two continuous and coaxial annular sections, axially radially and reciprocally movable, corresponding to tire sidewalls, and
   a plurality of sectors, corresponding to a perimeter zone outside of said tire, interposed between said annular sections and axially movable with respect thereto, said sectors being fixed to the radially inner surface of a containing-ring co-axial with said annular sections and axially movable with respect thereto, said sectors being radially shiftable with respect to the axis of said sections and axially shiftable with respect to at least one of said sections, each sector being provided on its radially inner surface with a matrix suited for molding of said outer perimeter zone of said tire, a corresponding portion of the tread design, and being provided on its radially outer surface with surfaces that are inclined with respect to the axis of said ring and coupled with a corresponding portion of the radially inner surface of said containing-ring, with reciprocal sliding means for the realization of said radial shifting of said sectors, said device being characterized by the fact that said sectors are provided with cavities which constitute a part of a circuit that is permanently closed to the outside ambient, suited for allowing the circulation of a fluid for directly heating said sectors, said cavities constituting a network of channels that present points of entry from the outside of the sector, for the inlet and outlet of said fluid, said network of channels comprising a plurality of axial blind-channels, having their axes parallel to that of the device, connected one to the other by a plurality of transverse blind-channels, each transverse blind-channel connecting at least two axial channels, said network of channels being connected with the radially outer surface of the sector by means of two substantially radial channels, respectively below and above, connected to at least one of said axial channels, the lower radial channel being disposed in correspondence to the axially lower extremity of said axial channels, each of said transverse and radial channels having its axis inclined, with respect to the axis of the corresponding axial channel, at an angle of about 90°.

2. The device according to claim 1, wherein the angle of inclination of the transverse and radial channels, is preferably comprised between 85° and 89°.

3. The device according to claim 1, wherein said circuit closed to the outside ambient, is realized by connecting all of the sectors in series, one to the next, according to a ring-shaped circuit, each upper radial channel being connected, by fluid-tight means, with the lower radial channel of the adjacent sector, with the exception of a radial upper channel connected by means of feeding and/or introducing said fluid and of the corresponding lower radial channel connected by means of suction and/or discharging said fluid.

4. The device according to claim 1 wherein said network of channels is connected, by fluid-tight means, to a similar system of channels made in said matrix.

5. The device according to claim 1, wherein said sectors are insulated from adjacent parts of the device, by means of zones of thermally insulating material.

6. The device according to claim 1, wherein said heating fluid is a vapor.

* * * * *